(12) United States Patent
Shima et al.

(10) Patent No.: US 6,633,402 B1
(45) Date of Patent: Oct. 14, 2003

(54) PRINTER CONTROLLER FOR CONTROLLING THE PRIORITIES OF TASKS IN THE PRINTER SYSTEM

(75) Inventors: Toshihiro Shima, Nagano (JP); Kazuhiko Iida, Nagano (JP); Susumu Shiohara, Nagano (JP); Tadashi Kobayashi, Nagano (JP); Norishige Kakuno, Nagano (JP); Ryoichi Shimizu, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/371,280

(22) Filed: Aug. 10, 1999

(30) Foreign Application Priority Data

Oct. 14, 1998 (JP) ........................................... 10-292473

(51) Int. Cl.⁷ ............................ G06F 3/12; G06F 13/00
(52) U.S. Cl. ..................................... 358/1.15; 358/1.14
(58) Field of Search ................................ 358/1.15, 1.9, 358/1.1, 1.14, 1.13; 709/102, 103, 106, 319–321; 710/7, 10, 17, 48, 310, 151

(56) References Cited

U.S. PATENT DOCUMENTS

| 4,992,958 A | | 2/1991 | Kageyama et al. ......... 364/519 |
| 5,481,656 A | * | 1/1996 | Wakabayashi et al. ...... 395/115 |
| 5,550,957 A | | 8/1996 | Davidson, Jr. et al. ..... 395/114 |
| 6,384,934 B1 | * | 5/2002 | Kohtani et al. .............. 358/1.9 |

FOREIGN PATENT DOCUMENTS

| JP | 10-78857 | 3/1998 | ............. G06F/3/12 |
| JP | 410143340 A | * 5/1998 | ............. G06F/3/12 |
| JP | 10-232752 | 9/1998 | ............. G06F/3/12 |
| JP | 10-254721 | 9/1998 | ............. G06F/9/46 |

OTHER PUBLICATIONS

Patent Abstracts of Japan, Publication No. 10232752 A, Publication Date Sep. 2, 1998, 1 Page.
Patent Abstracts of Japan, Publication No. 10254721 A, Publication Date Sep. 25, 1998, 1 Page.
Patent Abstracts of Japan, Publication No. 10078857 A, Publication Date Mar. 24, 1998, 1 page.
European Search Report dated Nov. 19, 2001, 3 pages.

* cited by examiner

*Primary Examiner*—Gabriel Garcia
*Assistant Examiner*—Douglas Tran
(74) *Attorney, Agent, or Firm*—Rosenthal & Osha L.L.P.

(57) ABSTRACT

The present invention is a printer controller furnished with a processor for exclusively executing a first task (printing task) for controlling a print engine, a second task (communication task) for controlling communication with host computers, and a third task (language task) for generating image data. These tasks are assigned priorities of execution in the order of the printing task, the communication task, and the language task. When there is a request for the execution of a task with a higher priority during the execution of a task with a lower priority, the processor executes the higher priority task whose execution has been requested instead of the lower priority task currently being executed. Therefore, the processor is able to execute the communication task, language task, and printing task with no conflict.

10 Claims, 16 Drawing Sheets

PRINTER CONTROLLER FOR CONTROLLING THE PRIORITIES OF TASKS IN THE PRINTER SYSTEM

BACKGROUND OF THE INVENTION

1. Field of the Invention

The present invention relates to arts for a printer connectable to a network and to a controller therefor. More particularly, the present invention relates to arts for a multitask program that is executed by this controller.

2. Description of the Related Art

As network technology has advanced in recent years, printers have come to be connected to a network via a network interface and shared by a plurality of host computers.

This network interface is equipped with a dedicated processor and a buffer, and communicates with the host computers by a specific protocol, thereby receiving print job data and storing them in the buffer. The controller connected to the printer unit is also equipped with a processor, and prints by receiving image data stored in the network interface buffer whenever necessary, while generating image data and issuing control commands to a print engine.

Specifically, with the above-mentioned conventional network printer, the network interface and the controller each have a processor, and the network interface and the controller are connected by internal dedicated buses. Consequently, the processor of the controller performs its print control while making image data transmission requests to the network interface so that there is no undesired variance in the printing results, without any consideration given to controlling the communication with the host computers.

SUMMARY OF THE INVENTION

The gist of the present invention is a printer controller in which the processor of the controller for controlling printing exclusively executes a first task (printing task) for controlling a print engine, a second task (communication task) for controlling communication with host computers, and a third task (language task) for generating image data, wherein priorities of execution are assigned in the order of printing task, communication task, and language task. When there is a request for the execution of a task with a higher priority during the execution of a task with a lower priority, the processor executes the higher priority task whose execution has been requested instead of the lower priority task currently being executed.

For example, when a communication interrupt occurs during the execution of a language task, which has a lower priority than a communication task, the processor commences the execution of the communication task instead of the language task currently being executed. If image data transfer request interrupt occurs during the execution of either a communication task or a language task, which have a lower priority than a printing task, the processor commences the execution of the printing task instead of the task currently being executed.

Typically, the present invention is realized by a program for controlling a printer and by a processor that executes this program. The program includes communication control means for controlling communication with host computers; language control means for generating image data; print control means for controlling a print engine; and execution means for exclusively executing either the communication control means, the language control means, or the print control means. Here, the print control means is assigned a higher priority than either the communication control means or the language control means, and the communication control means is assigned a higher priority than the language control means. The program is stored on a recording medium. Examples of recording media include ROM and RAM, as well as a hard disk (HD), DVD-RAM, DVD-ROM, a flexible disk (FD), and CD-ROM.

DESCRIPTION OF THE PREFERRED EMBODIMENTS

Preferred embodiments of the present invention are described in detail through reference to the appended drawings.

First Embodiment

Figure 1A:
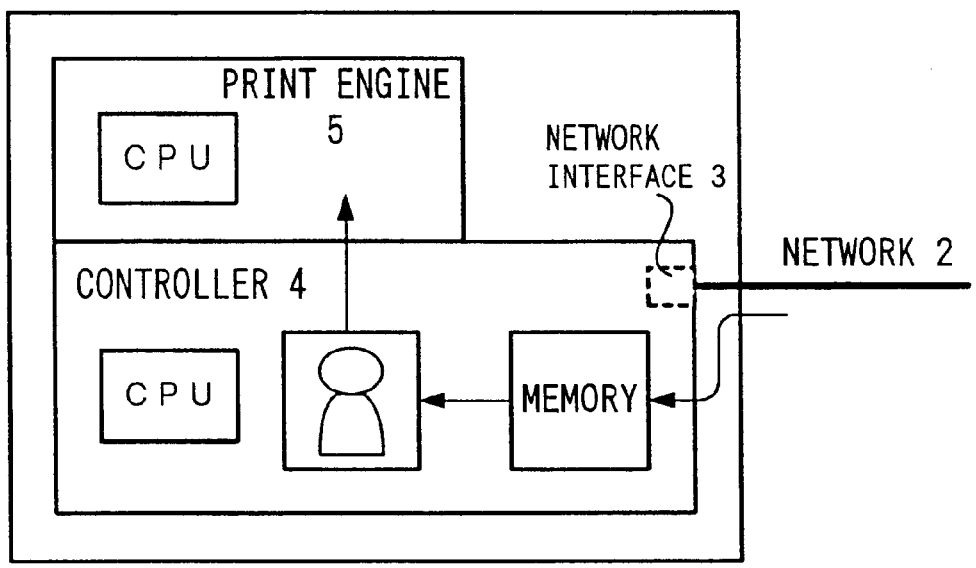
FIG. 1A is a block diagram illustrating the simplified structure of the printer pertaining to the present invention.
Figure 1B:
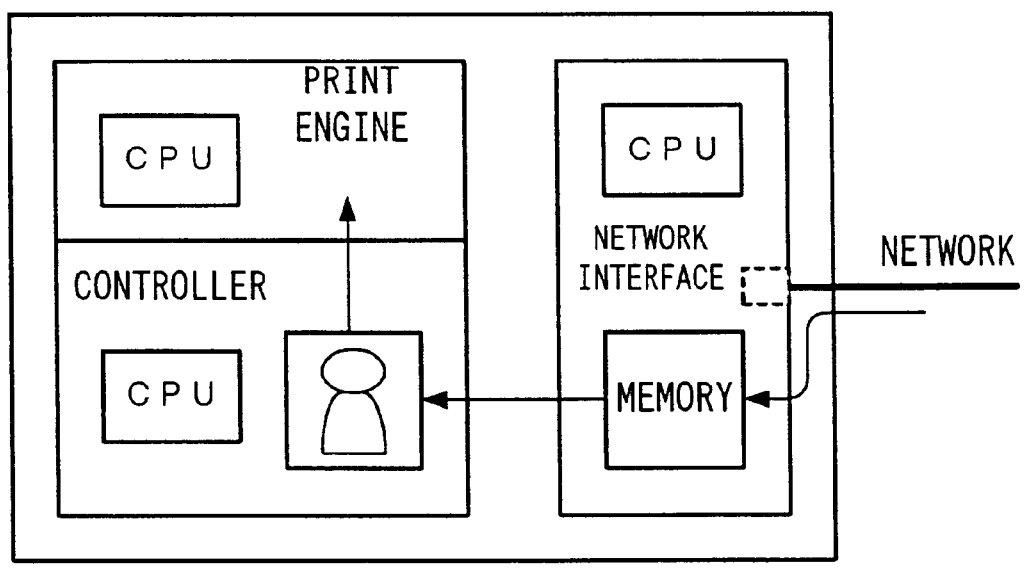
FIG. 1B is a block diagram illustrating the simplified structure of a conventional printer.

FIG. 1A illustrates the structure of the printer pertaining to the present invention. As shown there, the printer 1 pertaining to the present invention is characterized in that a controller 4 receives packet data via a network interface 3 connected to a network 2 so as to allow communication with host computers (not shown), generate image data on the basis of this packet data, and controls a print engine 5. In other words, with the printer pertaining to the present invention, the network interface and the controller do not have and are not controlled by independent CPUs (processors), as with the network-compatible printer shown in FIG. 1B.

Therefore, the term "network interface" in the present invention does not refer to one having a processor independent from the processor of the controller for network communication, and instead merely refers to an interface portion connected to a network and a controller.

Figure 2:
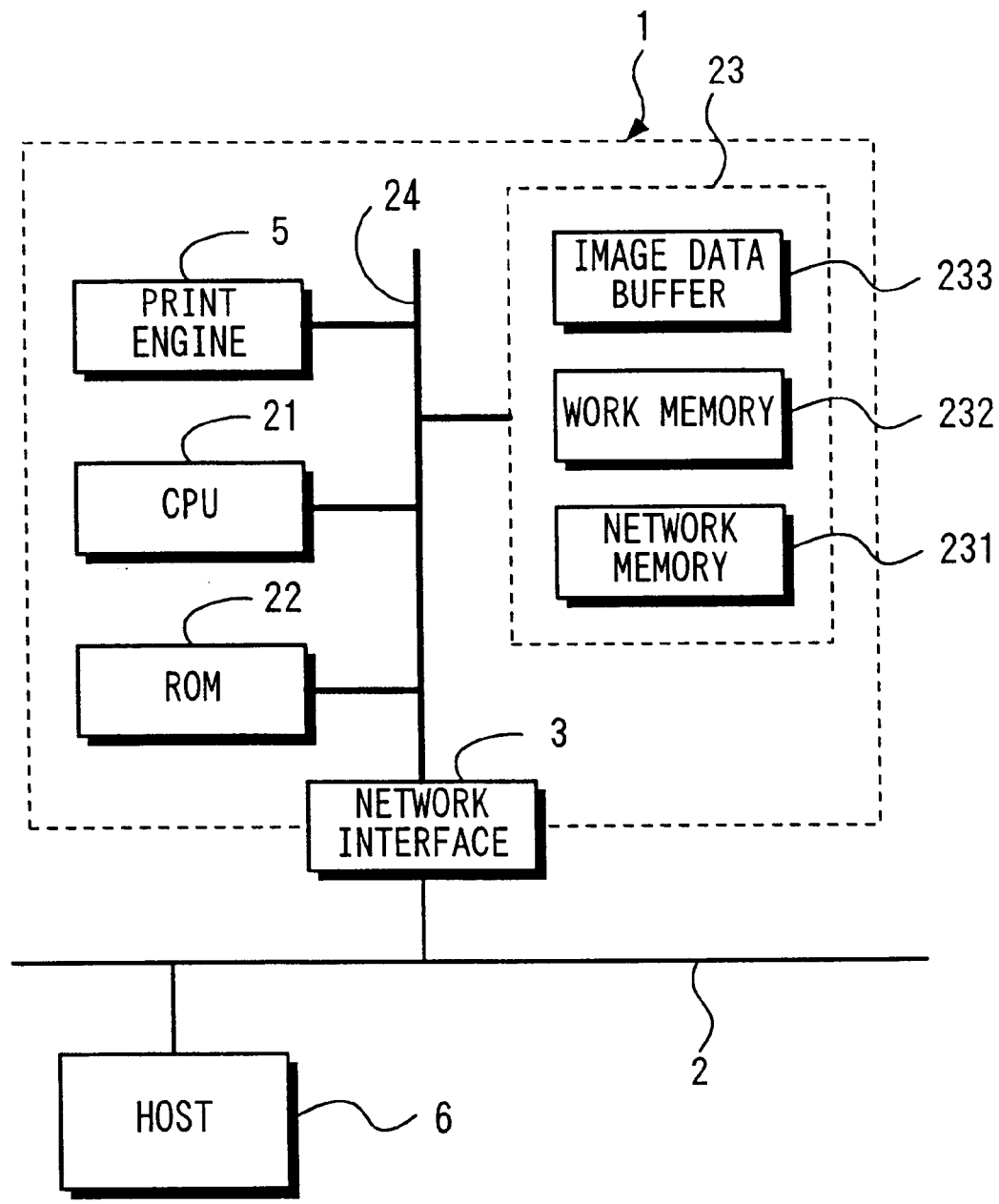
FIG. 2 is a block diagram illustrating the structure of the printer pertaining to the first embodiment.

FIG. 2 illustrates the structure of the printer pertaining to this embodiment. As shown in this figure, the printer 1 is connected so that it can communicate with a host computer (hereinafter referred to as "host") 6 via the network 2. The printer 1 is equipped with a network interface 3 connected to the network, a CPU 21, a ROM 22 that stores a program for implementing a specific function that is executed by this CPU 21, a RAM 23 available for the execution of the CPU 21, and a print engine 5, and these components are connected via a bus 24.

The network interface 3 detects self-addressed packet data on the network and sends it to the CPU 21 via the bus 24, and performs processing for putting packet data sent via the bus 24 from the CPU 21 to the host 6 on the network.

The CPU 21 executes a specific program stored in the ROM 22 and operates in conjunction with hardware so as to realize specific functions. The program in this embodiment comprises at least functions for receiving packet data, i.e., communication control, generating image data, i.e., language control, and controlling the print engine 5, i.e., print control, and with a function for managing these functions. Also, the specific program is stored in the ROM 22 in this embodiment, but it may instead be stored in an external storage device such as a hard disk and be executed by the CPU 21 by being loaded into the RAM 23 as needed.

The RAM 23 is comprised of a network memory 231, a work memory 232, and a image data buffer 233. These may be physically independent, or a single memory may be logically partitioned. The network memory 231 temporarily stores packet data received by the network interface 3. The work memory 232 temporarily stores data related to print job data in which the header portion has been extracted from the packet data stored in the network memory 231. The image data buffer 233 stores image data generated on the basis of the print job data stored in the work memory 232.

The print engine 5 includes, for example, a paper feed mechanism, a printing head, and the like, and serves to print on paper or another such print recording medium. The print engine 5 can be any of various engines corresponding to a line printer that prints in units of one line, a serial printer that prints in units of one character (such as and ink jet printer or a heat transfer printer), a page printer that prints in page units (such as a laser printer), or the like.

Figure 3:
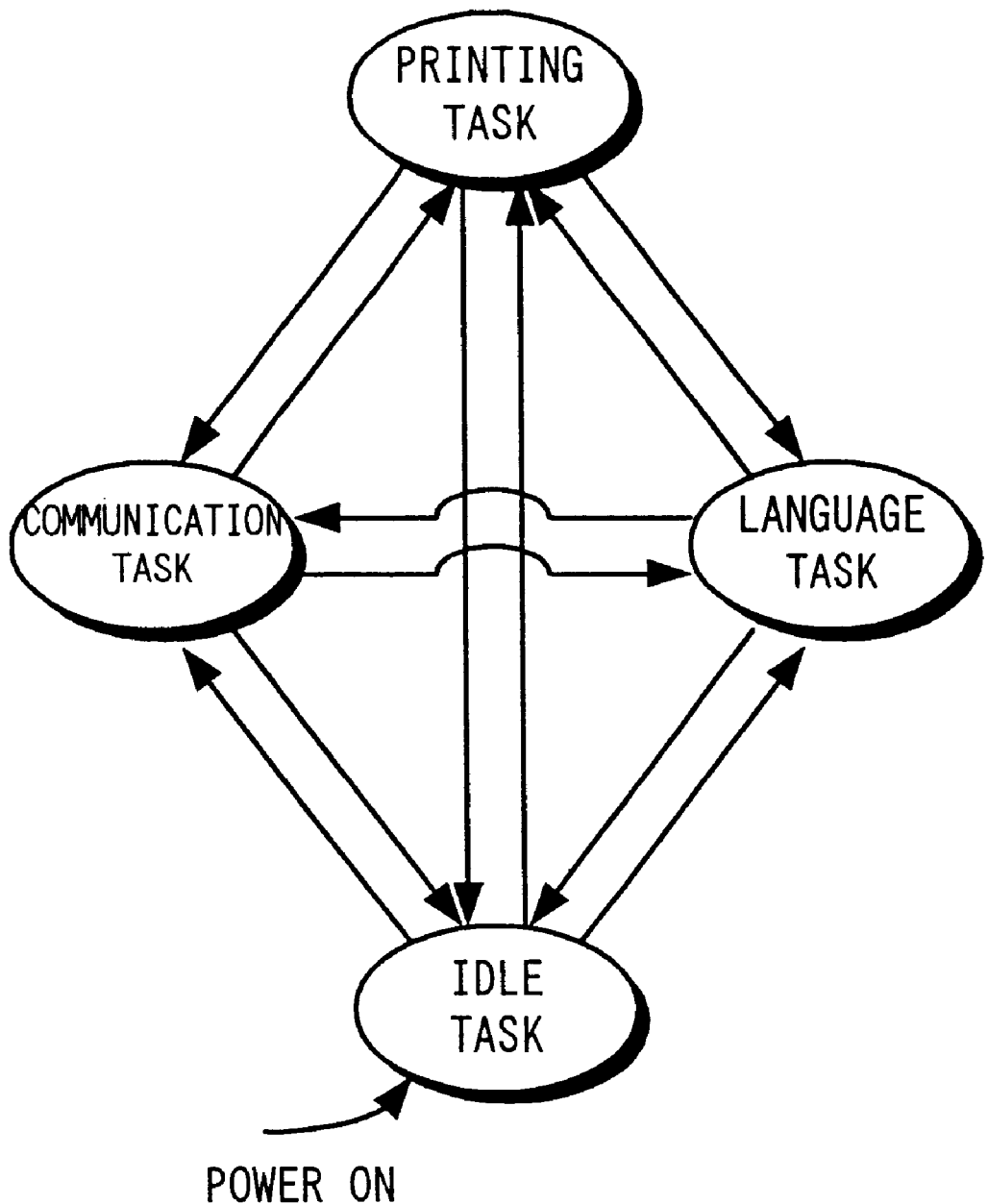
FIG. 3 schematically illustrates the operation of the program pertaining to the first embodiment.

FIG. 3 schematically illustrates the operation of the program pertaining to this embodiment. The program in this embodiment can be understood as a plurality of tasks (also called "processes") exclusively executed by the CPU 21. Specifically, in this embodiment, the CPU 21 exclusively executes a printing task for controlling a print engine 5, a communication task for controlling communication with host computers, a language task for generating image data, and an idle task for maintaining an idle state, all under the control of a management task that is superior to these tasks. The management task performs priority changes, scheduling, dispatches, and so forth, and typically corresponds to an operating system. The printing task, communication task, and language task are put in an executable state when a semaphore (discussed below) is acquired, and the tasks that have become executable are executed after being scheduled on the basis of their priority.

In this embodiment, the execution of each task is managed by a semaphore, but is not intended to be limited to this. The acquisition of a semaphore is continuously tried, and a task is executed when a semaphore has been acquired. The semaphore is returned when the execution of a certain task has been completed. This acquisition of a semaphore is also called a P-operation, and the return of a semaphore a V-operation. A semaphore is returned when an interrupt occurs, and a task acquires this semaphore. In this embodiment, a semaphore is utilized to notify a task that an interrupt has occurred, or to notify another task that a task has completed its own processing. A message signal may also be used for this communication and synchronization between tasks.

An idle task is a task executed for event stand-by. The lowest priority is assigned to an idle task. In other words, an idle task is executed when none of the other tasks discussed below is being executed. For instance, an idle task is executed immediately after the power has been turned on to the printer, or upon completion of printing.

A communication task is a task that is executed by an interrupt occurring as a result of the network interface 3 receiving self-addressed packet data. A communication task communicates with the host 6 to receive packet data, and excludes the unnecessary header portion from the packet data to extract a print job data. In this case, the communication task is processed with a view to the balance between the communication status of the network and the extraction status of the print job data. The communication task releases the CPU 21 when the extraction of the print job data is complete.

A language task is a task that is executed when a semaphore for completing the extraction of a print job data is acquired (print job data semaphore). The language task generates image data according to a print request stored in the work memory 232, and writes this to the image data buffer 233. The language task releases the CPU 21 when the image data required for printing (such as one band or one page of image data) is generated.

A printing task is a task that is executed when the print request semaphore resulting from the language task is acquired, or when a semaphore resulting from a data transfer request interrupt from the print engine 5 (a printing commencement semaphore) is acquired. First of all, when a print request semaphore is acquired, a printing task issues a paper feed command to the print engine 5 and temporarily releases the CPU 21. The print engine 5 receives this paper feed command, controls the paper feed mechanism or the like, prepares the state required for printing commencement, and orders a data transfer request interrupt to the CPU 21. When there is a data transfer request interrupt from the print engine 5, with a page printer, for example, the printing task executes one band of printing control. In this case, the printing task executes the printing control while monitoring the state of the print engine 5. Specifically, the printing task monitors the paper advance control of the print engine 5 and other such aspects of progress status. The printing task releases the CPU 21 when all of the print control processing based on the print request has been completed.

The characteristic feature of this embodiment is that the various tasks in an executable state behave in their order of priority. In other words, each task is assigned an execution priority, and when there is an execution request for a task with a higher priority while a task with a lower priority is being executed, the execution (processing) of the lower priority task will be suspended and the execution of the higher priority task commenced.

In this embodiment, higher priority is assigned in the order of a printing task, a communication task, a language task, and an idle task. Priority is not an absolute value, and should be determined relatively among these tasks.

Next, the printer controller pertaining to this embodiment is functionally expressed and described through reference to a function block diagram structured of function realization means.

Figure 4:
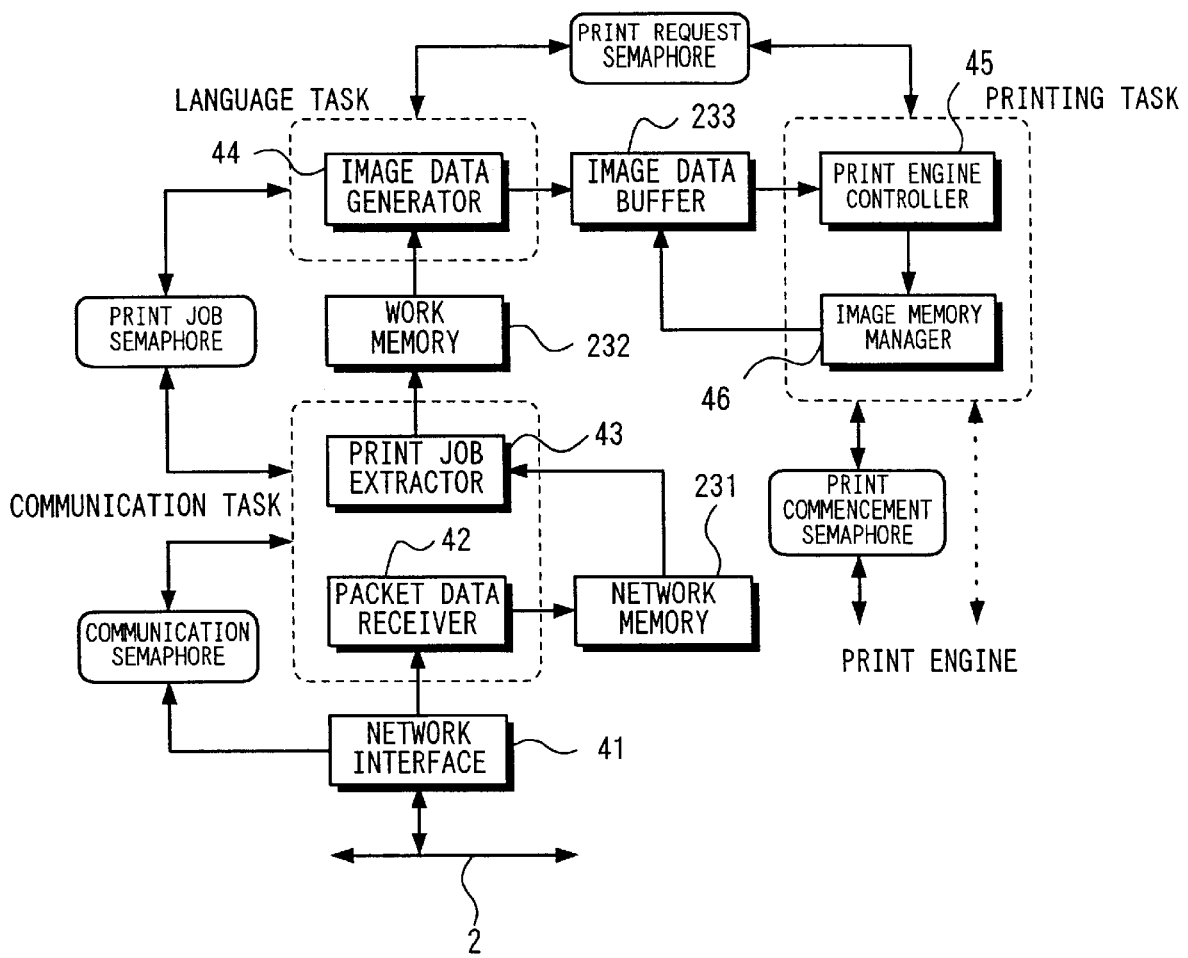
FIG. 4 is a block diagram of the printer controller pertaining to the first embodiment.

FIG. 4 is a function block diagram of the printer controller pertaining to this embodiment. As shown in this figure, each task consists of one or more function realization means. A network interface 41 (corresponds to the above-mentioned network interface 3) monitors the network 2 and orders an interrupt to the CPU 21 when self-addressed packet data arrives. This interrupt results in the return of a semaphore (communication semaphore). A packet data receiver 42 writes the arriving packet data to the network memory 231 when this semaphore is successfully acquired. A print job data extractor 43 extracts a print job data from the packet data stored in the network memory 231, and writes this to the work memory 232. When the processing at the print job data extractor 43 is complete, the semaphore for which the print job data extraction has been completed (print job data semaphore) is returned.

When the print job data semaphore has been successfully acquired, an image data generator 44 generates image data on the basis of the print job data stored in the work memory 232, and writes it to the image data buffer 233. At the point when the amount of image data needed for printing has been generated, the semaphore (print request semaphore) is returned.

A print engine controller 45 issues a paper feed command to the print engine 5 when a print request semaphore has been successfully acquired. The print engine 5 orders a data transfer request interrupt to the CPU 21 at the point when printing preparations are ready. This interrupt results in a semaphore (printing commencement semaphore) being returned. As a result, the printing task successfully acquires a printing commencement semaphore, and image data corresponding to the operating status of the print engine 5 is sent to the print engine 5. The print engine controller 45 notifies an image data buffer manager 46 when printing corresponding to a given print request has been completed. The image data buffer manager 46 receives this notification and clears the image data stored in the image data buffer 233.

Each of the tasks structured function realization means as above is executed according to the priorities discussed above. For instance, if a communication interrupt occurs during the execution of the image data generator 44, a communication task which has a higher priority than a language task will acquire a communication semaphore, and the packet data receiver 42 will commence execution. If an interrupt for a data transfer request from the print engine 5 occurs, a printing task which has a higher priority than a language task will acquire a printing commencement semaphore, and the print engine controller 45 will commence execution. Similarly, if an interrupt for a data transfer request occurs during the execution of the packet data receiver 42, a printing task which has a higher priority than a communication task will acquire a printing commencement semaphore, and the print engine controller 45 will commence execution. When a certain task completes the execution of a given processing, the task with the next highest priority will be executed at that point.

Figure 5:
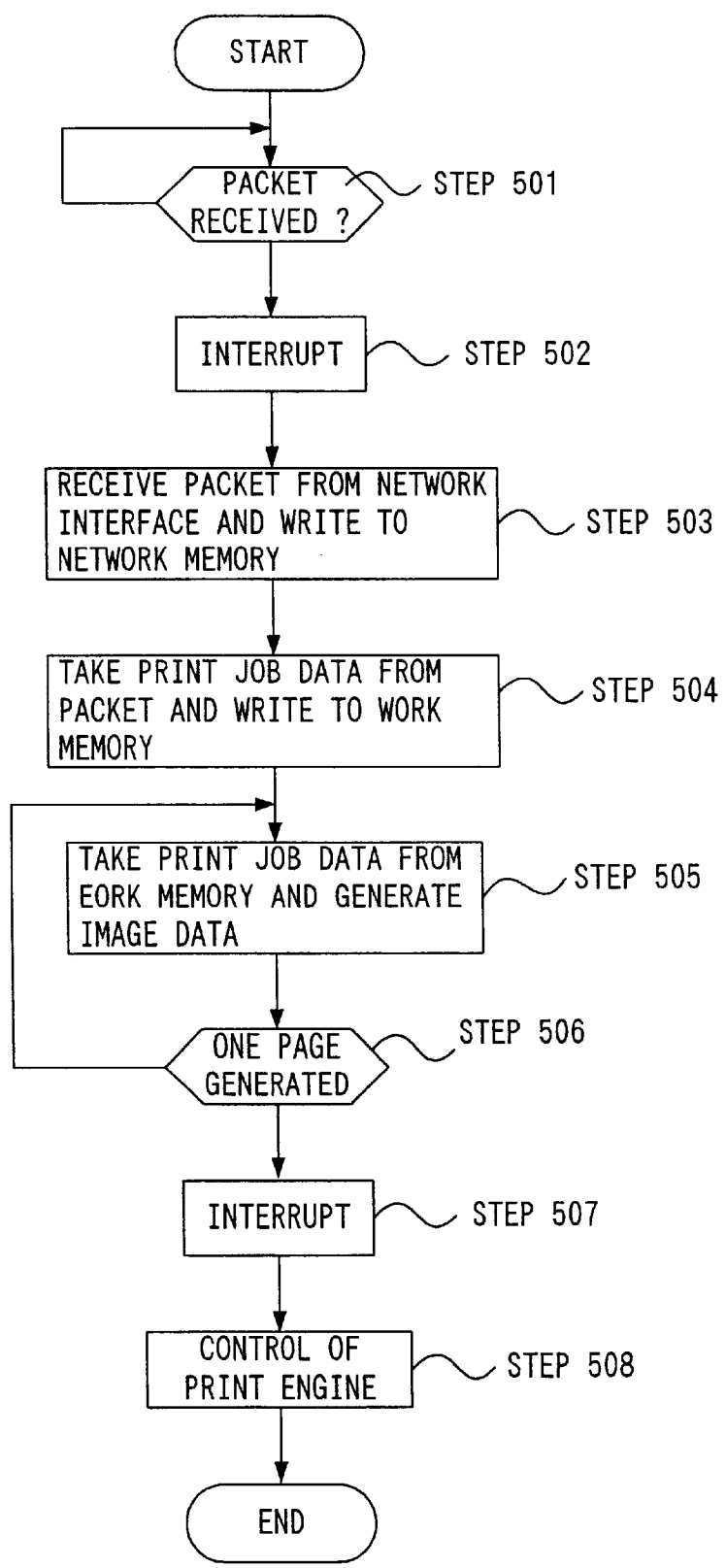
FIG. 5 is a flow chart illustrating the operation of the printer controller pertaining to the first embodiment.

FIG. 5 is a diagram illustrating the operation of the printer controller pertaining to this embodiment. As shown in this figure, a network interface 41 decides whether self-addressed packet data has been received (step 501). A communication interrupt occurs when packet data is received (step 502), and the packet data receiver 42 takes the packet data from the network interface 41 and writes it to the network memory 231 (step 503). Also, the print job data extractor 43 extracts a print job data from the packet data and writes it to the work memory buffer 232 (step 504). Once a print job data has been extracted, the image data generator 44 generates image data on the basis of the print job data stored in the work memory 232 (step 505). The image data generator 44 decides whether the amount of image data required for printing has been generated, and if it is decided that enough image data for printing has been generated, the print engine controller 45 is notified to this effect (step 506). The print engine controller 45 issues a paper feed command or the like to the print engine 5, and orders a data transfer request interrupt at the point when everything is ready for printing (step 507). The print engine controller 45 controls the print engine 5 while monitoring the operating state of the print engine 5 (step 508). As a result, printing is performed on paper or other print recording medium.

The above-mentioned operation is carried out according to the priorities of the various tasks. For example, in step 505, the receipt of packet data is performed (step 503) when a communication interrupt occurs during the generation of image data (step 502). Similarly, when a data transfer request interrupt occurs (step 507), any processing up to that point is suspended and control of the print engine 5 is performed (step 508). A task that has been interrupted and suspended in its execution is once again executed and processing performed when an execution right is granted as a result of this interrupt processing being completed, or as a result of the CPU 21 being released by a task with a higher priority.

As long as there is no conflict in the processing results, the order of the processing may be switched in the above-mentioned operation of the printer controller.

Figure 6:
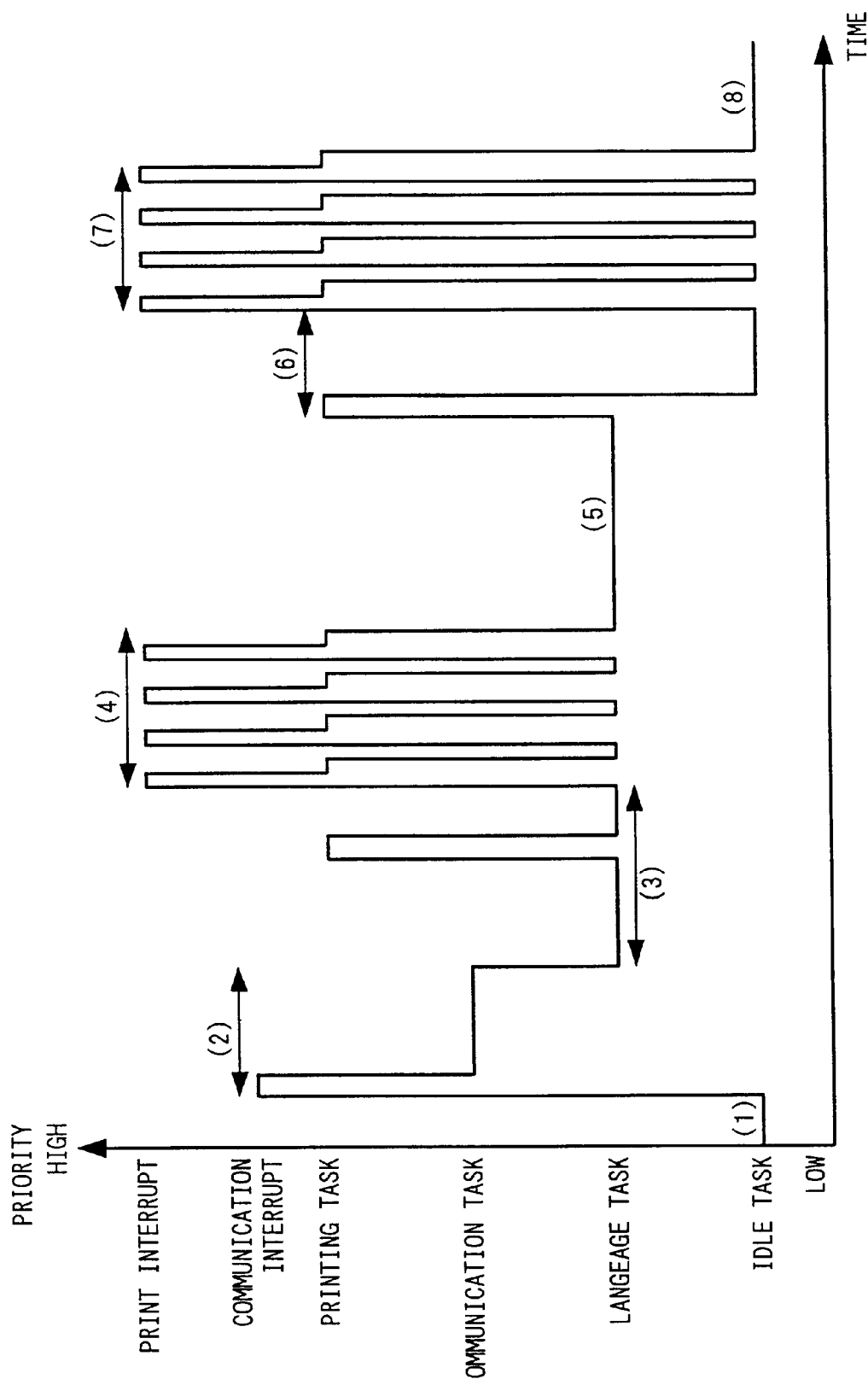
FIG. 6 is a timing chart illustrating an operation example of the printer controller pertaining to the first embodiment.

FIG. 6 is a diagram illustrating an operation example of the printer controller pertaining to this embodiment. This will be described in chronological order.

(1): When the power is turned on to the printer, an idle task is executed and the other tasks are in stand-by mode.

(2): A communication interrupt occurs when packet data is received. A communication task is executed by the generation of a communication interrupt. The communication task writes the packet data to the network memory and extracts a print job data. In this case, the execution of the communication task may be halted and the CPU released to another task depending on the memory space.

(3): A language task generates image data as a result of a print job data being extracted. When one page of image data has been generated, the language task notifies the printing task to this effect. The printing task issues a paper feed command to the print engine when enough image data has been generated for printing. In other words, the printing task is executed preferentially over the execution of the language task. When the issuance of the paper feed command by the printing task is complete, the execution of the language task is resumed.

(4): Once the print engine has received the paper feed command and printing preparations are complete, a data transfer request interrupt is generated for every band. In other words, a single printing task is executed every time a single printing interrupt is generated for every band.

(5): While the printing task is releasing the CPU 21 and when the printing of a corresponding page is complete, the execution of the language task is resumed, and the printing task is notified when a printing request is finished.

(6): The printing task similarly issues a paper feed command and execution is suspended for the time being. In this case, since the processing of the language task has also already been concluded, the flow moves on to the idle task.

(7): Once the print engine has completed its printing preparations, a data transfer request interrupt occurs and a second page is printed just as in (4) above.

(8): Since there is no processing for any task once the execution of a printing task has been completed, the flow goes back to the idle task to await a new event.

In the above operation example of a printer controller, only one communication interrupt was discussed in order to simplify the explanation, but this is not a limitation, and in actual practice communication interrupts occur a specific number of times according to the amount of data or network control.

As above, with this embodiment, the processing that used to be performed independently by the processor provided to the network interface and by the processor provided to the controller can now be executed by just the processor provided to the controller. Therefore, there is no need for a conventional network interface, which saves the trouble of setting the network interface in an expansion slot or the like.

Also, since communication control, language control, and print control are carried out by the processor of the controller, all of these need to be controlled so as to satisfy the requirements assigned to each control, and in this embodiment a priority is assigned to each control (task) and execution is controlled on the basis of these priorities, so printing can be carried out with no conflict. In particular, with this embodiment, a higher priority is assigned to print control, communication control, and language control, in that order, so printing can be controlled without any undesired variance in the printing results and without communication being disconnected.

Second Embodiment

Figure 7:
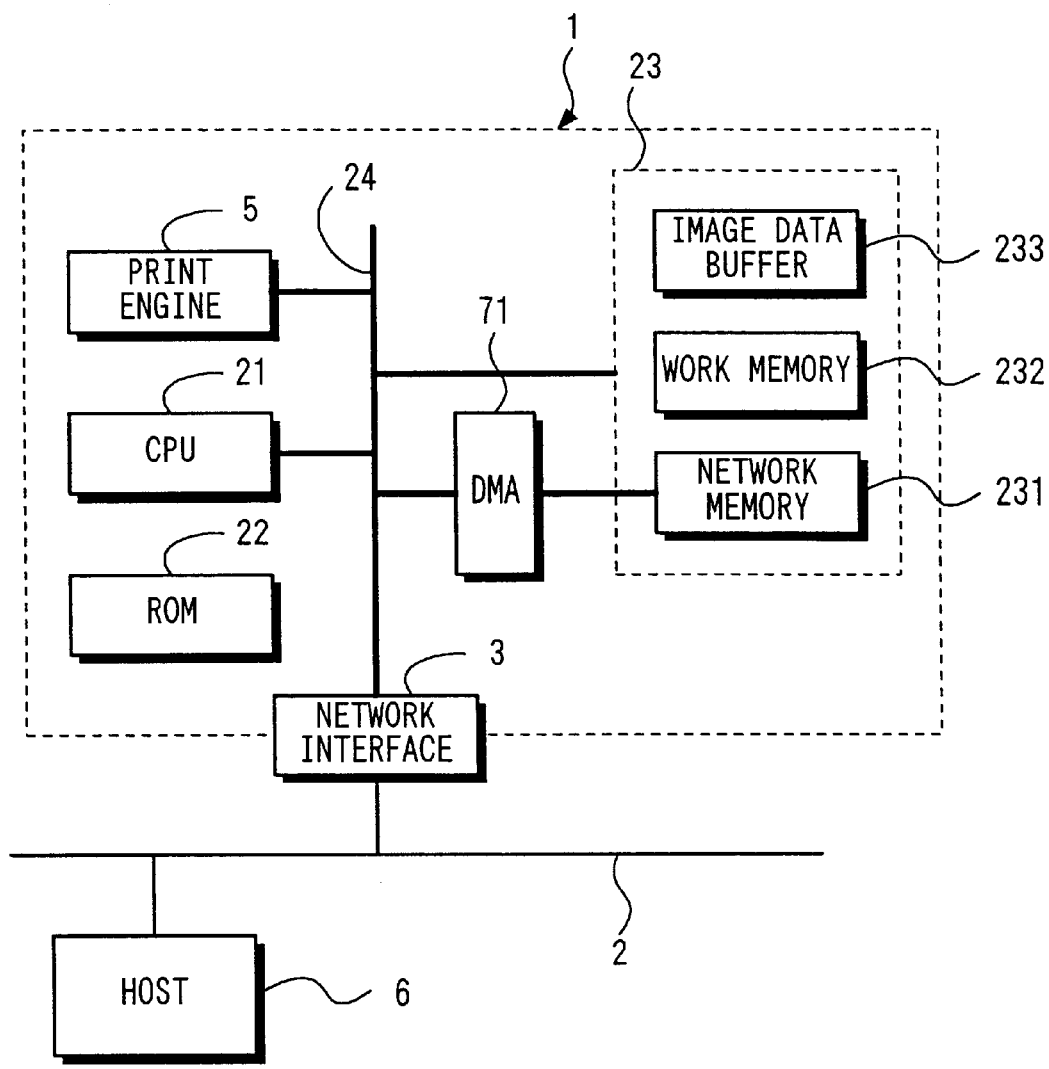
FIG. 7 is a block diagram illustrating the structure of the printer pertaining to the second embodiment.

FIG. 7 illustrates the structure of the printer pertaining to this embodiment. This embodiment is characterized in that a DMA (Direct Memory Access) device (hereinafter referred to as "DMA") is added to the structure of the printer of the above-mentioned first embodiment. In this figure, those members (function realization means) that are the same as in the first embodiment are labeled the same.

When the network interface 3 detects self-addressed packet data on the network, it sends an interrupt signal to the CPU 21. The CPU 21 sets a DMA 71 for the receipt of packet data when a communication interrupt occurs. In other words, the CPU 21 issues a command to the DMA 71 to write the packet data in the received size to a specific address. As a result, the CPU 21 is released from processing for the receipt of the packet data.

At the direction of the CPU 21, the DMA 71 writes the packet data that has arrived at the network interface 3 to the specified address in the designated size. The DMA 71 also sends an interrupt signal to the CPU 21 when it has finished writing the designated size.

Figure 8:
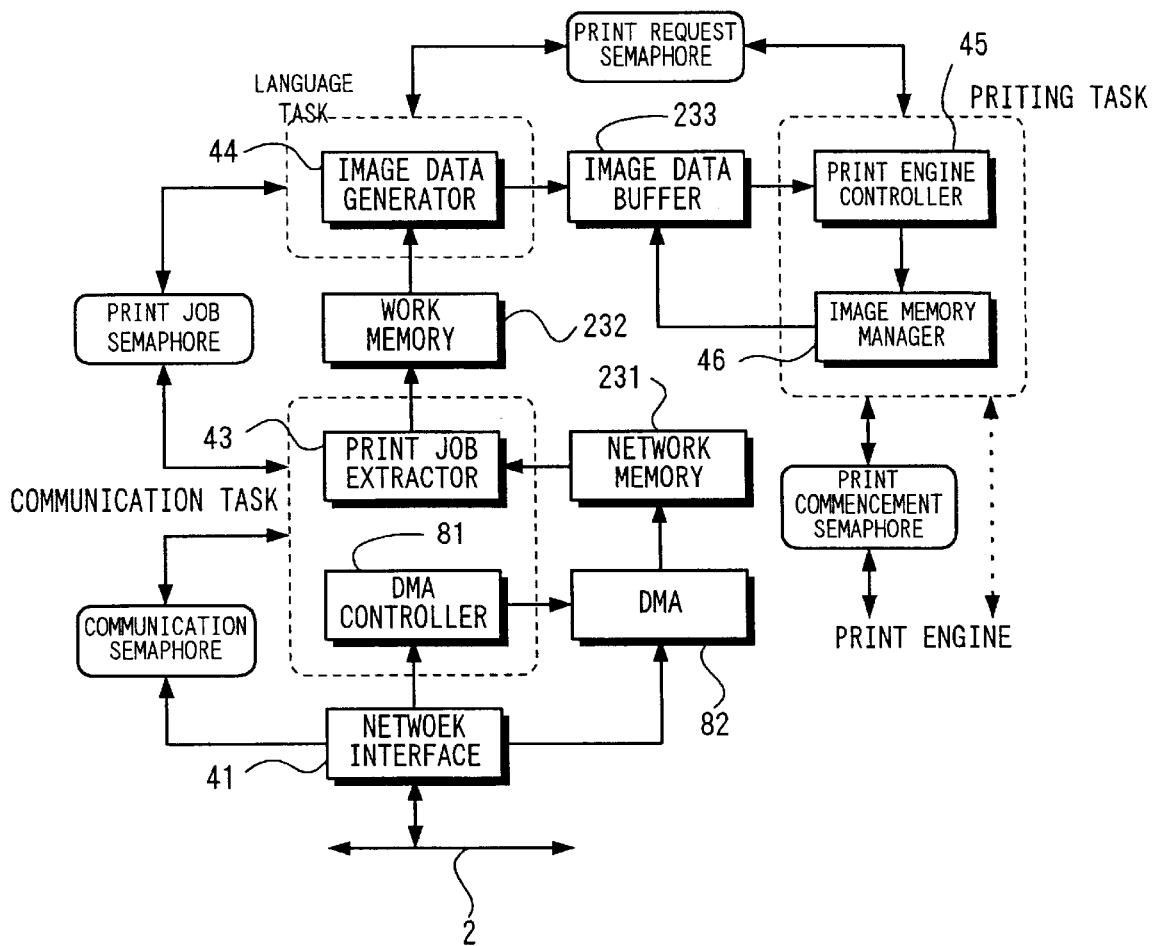
FIG. 8 is a block diagram of the printer controller pertaining to the second embodiment.

FIG. 8 is a function block diagram of the printer controller pertaining to this embodiment. In this figure, those members (function realization means) that are the same as in the first embodiment are labeled the same.

The network interface 41 monitors the network 2 and applies a communication interrupt to the CPU 21 when packet data addressed to itself arrives. As a result of this interrupt, DMA controller 81 sets the size and address in a DMA 82 (corresponds to the DMA 71 in FIG. 7) when a semaphore has been successfully acquired, and issues a write commencement command to the DMA 82. The DMA 82 writes packet data of the designated size to the network memory 231. The DMA 82 also orders an interrupt signal to the CPU 21 when it has finished writing the designated size. As a result of this interrupt, the print job data extractor 43 extracts a print job data from the packet data held by the network memory 231.

The other function realization means are the same as in the first embodiment.

Figure 9:
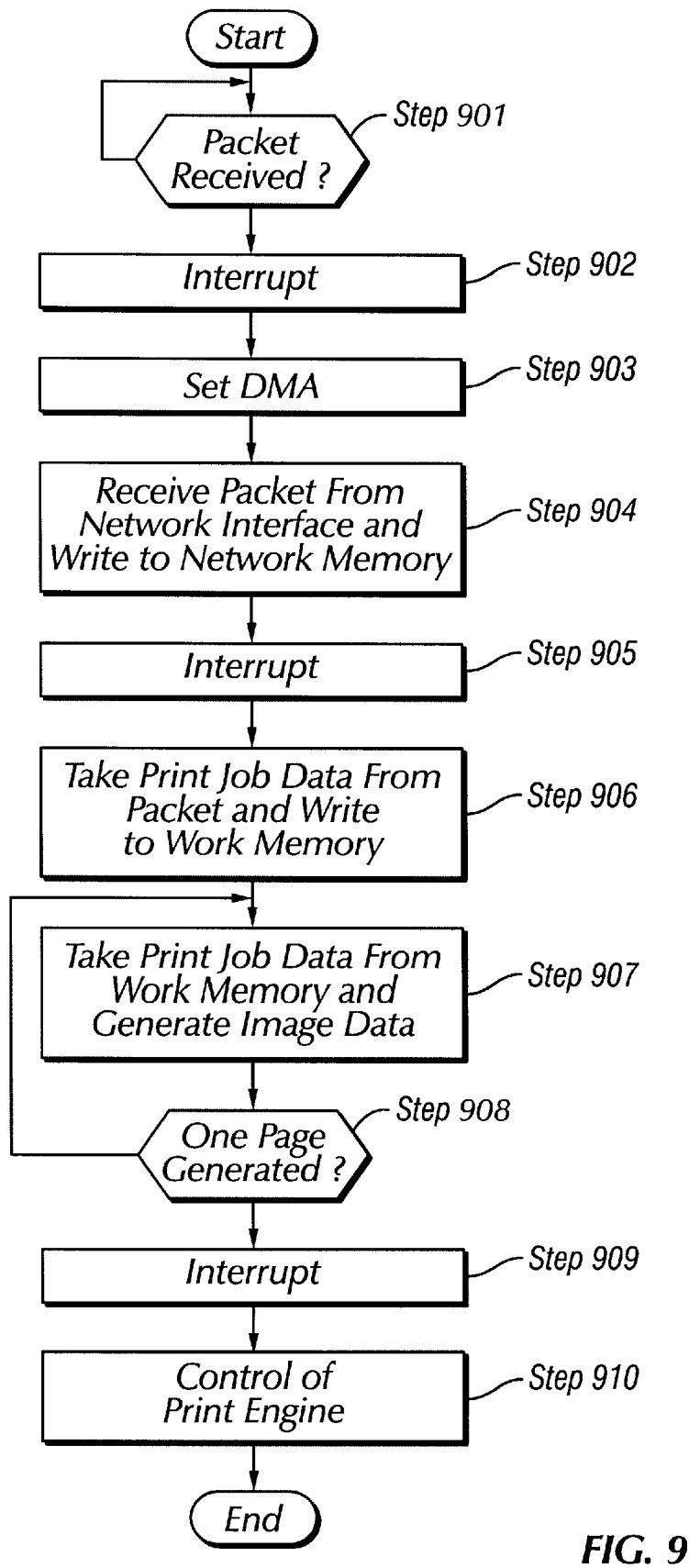
FIG. 9 is a flow chart illustrating the operation of the printer controller pertaining to the second embodiment.

FIG. 9 is a diagram illustrating the operation of the printer controller pertaining to this embodiment. As shown in this figure, the network interface 41 decides whether self-addressed packet data has been received (step 901). A communication interrupt occurs when packet data is received (step 902), and the DMA controller 81 sets the size and address for the DMA 82 (step 903). The DMA 82 takes the packet data from the network interface 41 and writes it to the network memory 231 (step 904). Once it has finished writing the designated size, the DMA 82 orders a completion interrupt to the CPU 21 (step 905). The print job data extractor 43 extracts a print job data from the packet data and writes it to the work memory 232 (step 906). Once a print job data has been extracted, the image data generator 44 generates image data on the basis of the print job data stored in the work memory 232 (step 907). The image data generator 44 then decides whether the amount of image data required for printing has been generated, and if it is decided that enough image data for printing has been generated, the print engine controller 45 is notified to this effect (step 908). The print engine controller 45 issues a paper feed command or the like to the print engine 5, and orders a data transfer request interrupt at the point when everything is ready for printing (step 909). The print engine controller 45 controls the print engine 5 while monitoring the operating state of the print engine 5 (step 910). As a result, printing is performed on paper or other print recording medium.

The above-mentioned operation is carried out according to the priorities of the various tasks. For example, in step 905, the DMA is operated and the receipt and writing of packet data are performed (steps 903 and 904) when a communication interrupt occurs during the generation of image data (step 902). Similarly, when a data transfer request interrupt occurs (step 909), any processing up to that point is suspended and control of the print engine 5 is performed (step 910). A task that has been interrupted and suspended in its execution is once again executed and processing performed when an execution right is granted.

As long as there is no conflict in the processing results, the order of the processing may be switched in the above-mentioned operation of the printer controller.

As above, with this embodiment, since a DMA is provided so that data is transferred directly between the network interface and the memory without going through the CPU, the CPU is released instantly upon completion of setting the DMA. Therefore, the CPU can be allocated to other processing, and efficiency improves proportionately.

Third Embodiment

Figure 10:
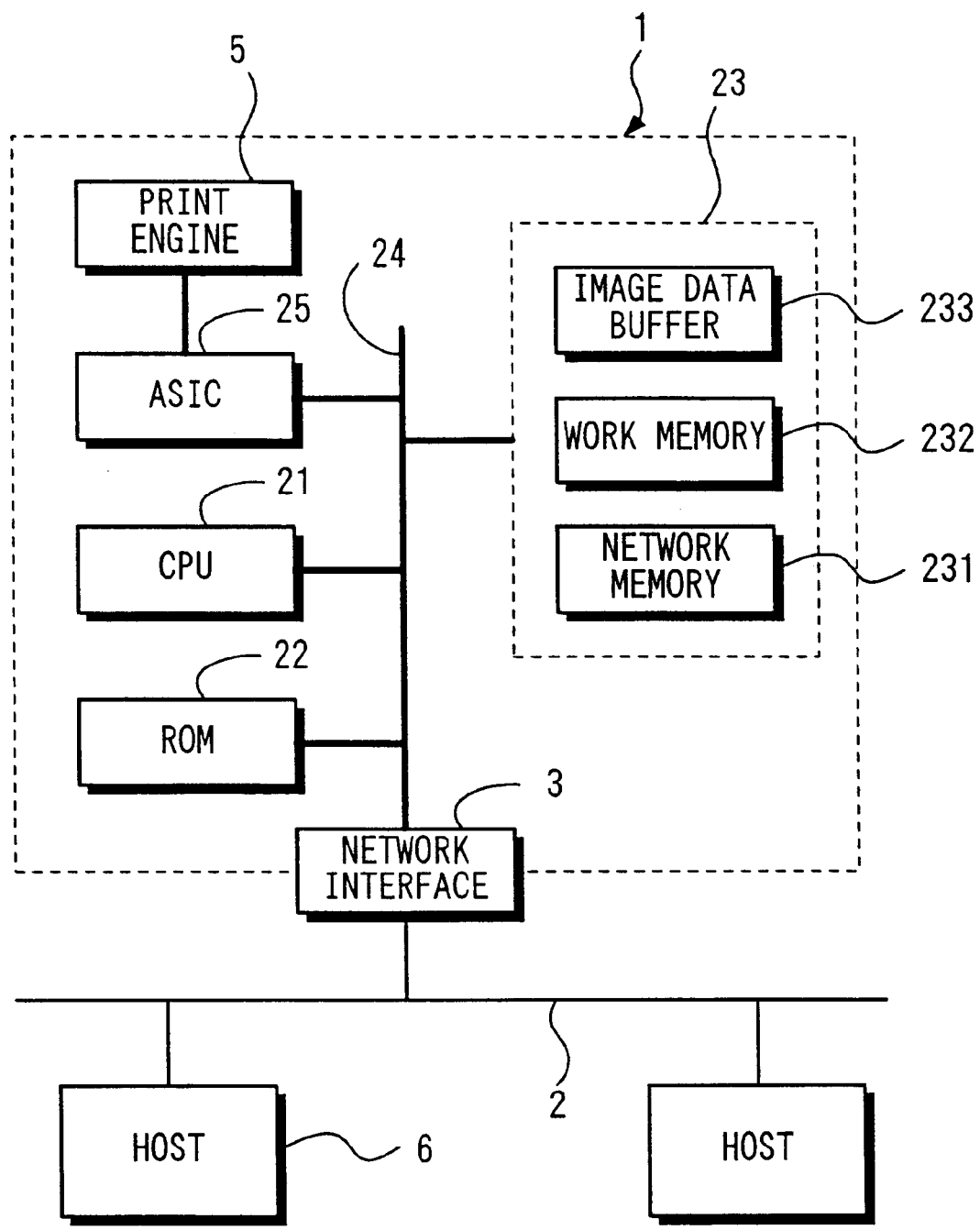
FIG. 10 is a block diagram illustrating the structure of the printer pertaining to the third embodiment.

FIG. 10 is a diagram illustrating the structure of the printer pertaining to this embodiment. The characteristic feature of this embodiment is that the print control (printing task) is constituted by an ASIC (Application Specific IC) 25. As a result, the processor (CPU) provided to the controller controls the ASIC 25 instead of executing the printing task.

In this case, the communication task and language task consist of programs and are executed by the CPU, just as in the embodiments given above. However, the priority thereof is set higher for the communication task than for the language task.

The printer pertaining to the present invention can also be constituted by a combination of the second embodiment and this embodiment. Specifically, a DMA and an ASIC may be provided.

As above, with this embodiment, since the ASIC is constituted such that it performs print control, the CPU does not need to execute the printing task and can allocate its performance to other tasks, such as communication tasks and language tasks. The print control in particular must be carried out preferentially over other controls because of the need to avoid undesired variance in the printing results. Consequently, the incidence of suspending a task every time there is a data transfer request interrupt can be reduced, allowing communication control, language control, and so on to be carried out more efficiently.

Fourth Embodiment

This embodiment is characterized in that it comprises a parallel interface in place of the above-mentioned network interface.

Figure 11:
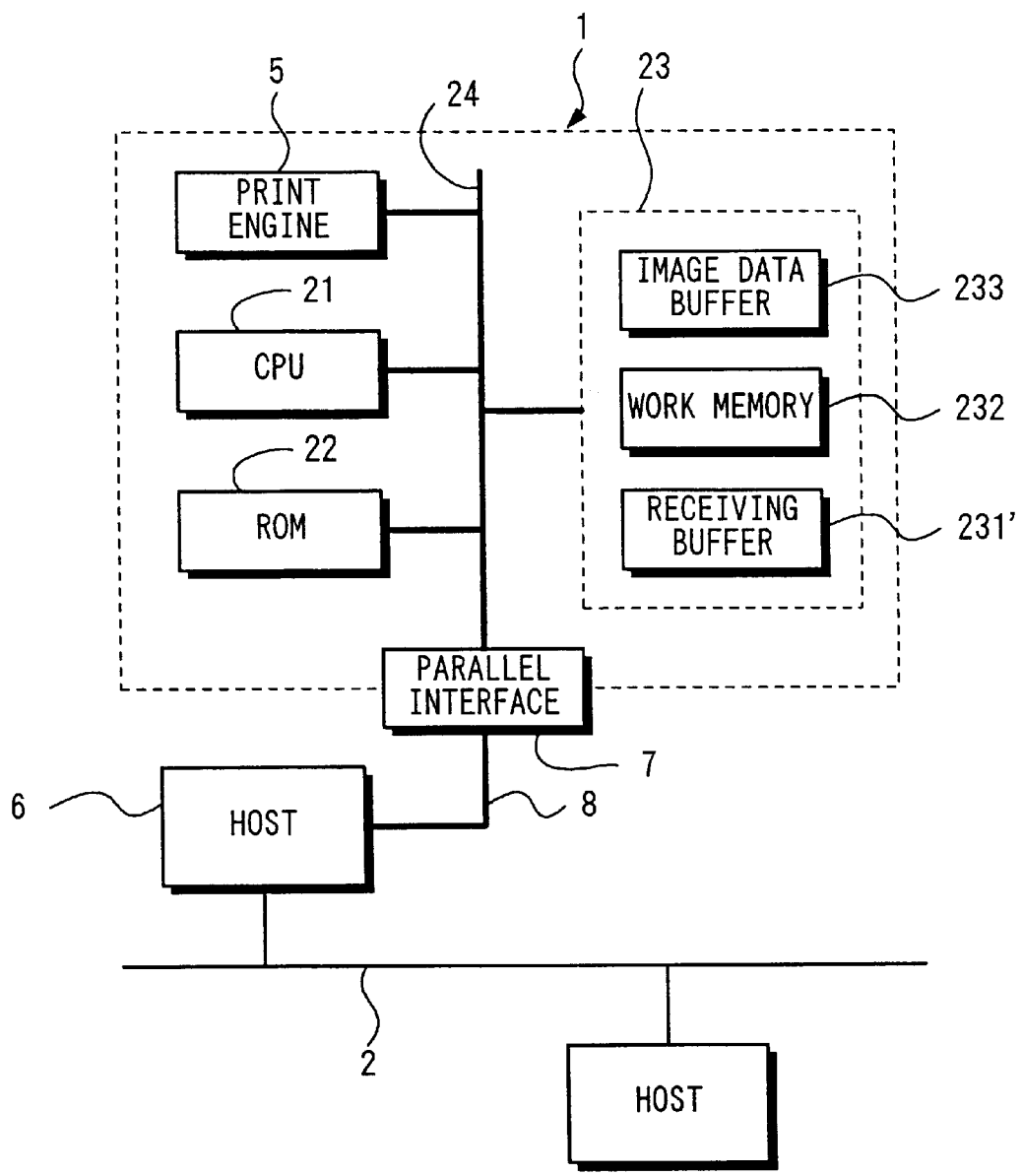
FIG. 11 is a block diagram illustrating the structure of the printer pertaining to the fourth embodiment.

FIG. 11 is a diagram illustrating the structure of the printer pertaining to this embodiment. In this figure, a parallel interface 7 is connected to the host 6 by a parallel dedicated bus 8. When it receives one byte of data (a print job data) from the host 6, the parallel interface 7 sends an interrupt signal to the CPU 21. The printer in this embodiment is able to communicate in both directions with the host 6 via the parallel interface 7.

The CPU 21 reads the data received by the parallel interface 7 and writes it to a receiving buffer 231'. When all of the data has been received from the host 6, the CPU 21 generates image data and controls the print engine 5 on the basis of the data held in the receiving buffer 231'.

A printer controller structured as above, just as in the embodiments given above, can be controlled by programs understood as communication tasks, language tasks, and printing tasks.

Figure 12:
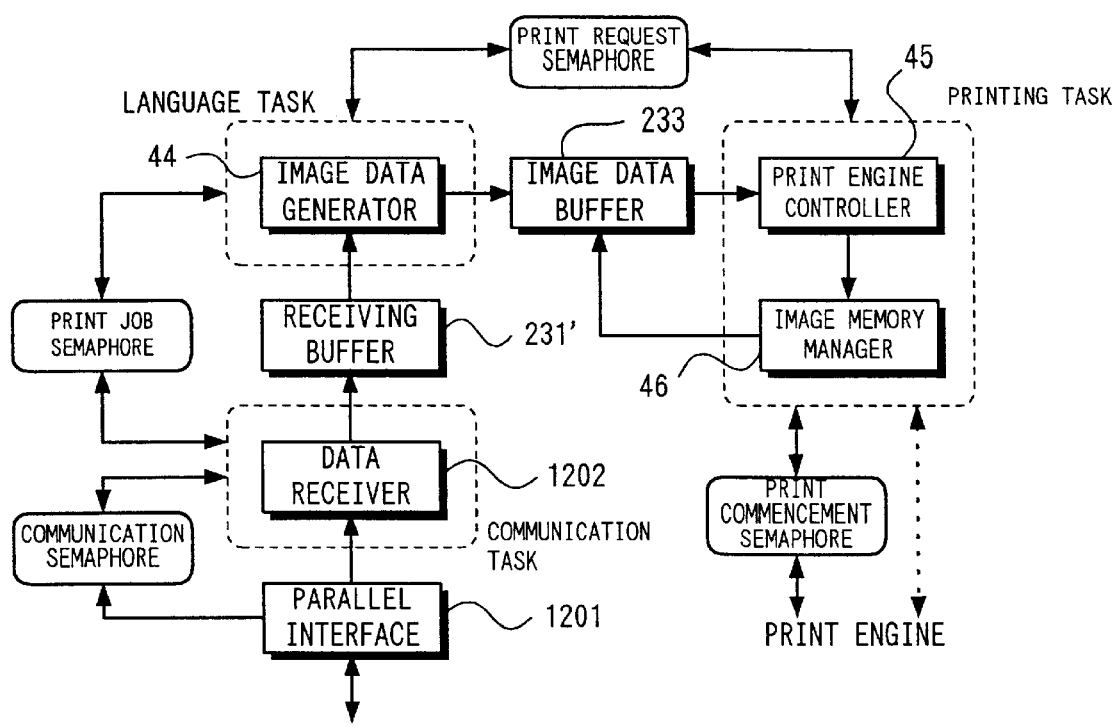
FIG. 12 is a block diagram of the printer controller pertaining to the fourth embodiment.

Specifically, FIG. 12 is a function block diagram of the printer controller pertaining to this embodiment. A parallel interface 1201 sends an interrupt signal to the CPU 21 upon receiving one byte of data. A data receiver 1202 receives the data arriving at the parallel interface 1201 and writes it to the receiving buffer 231'.

Figure 13:
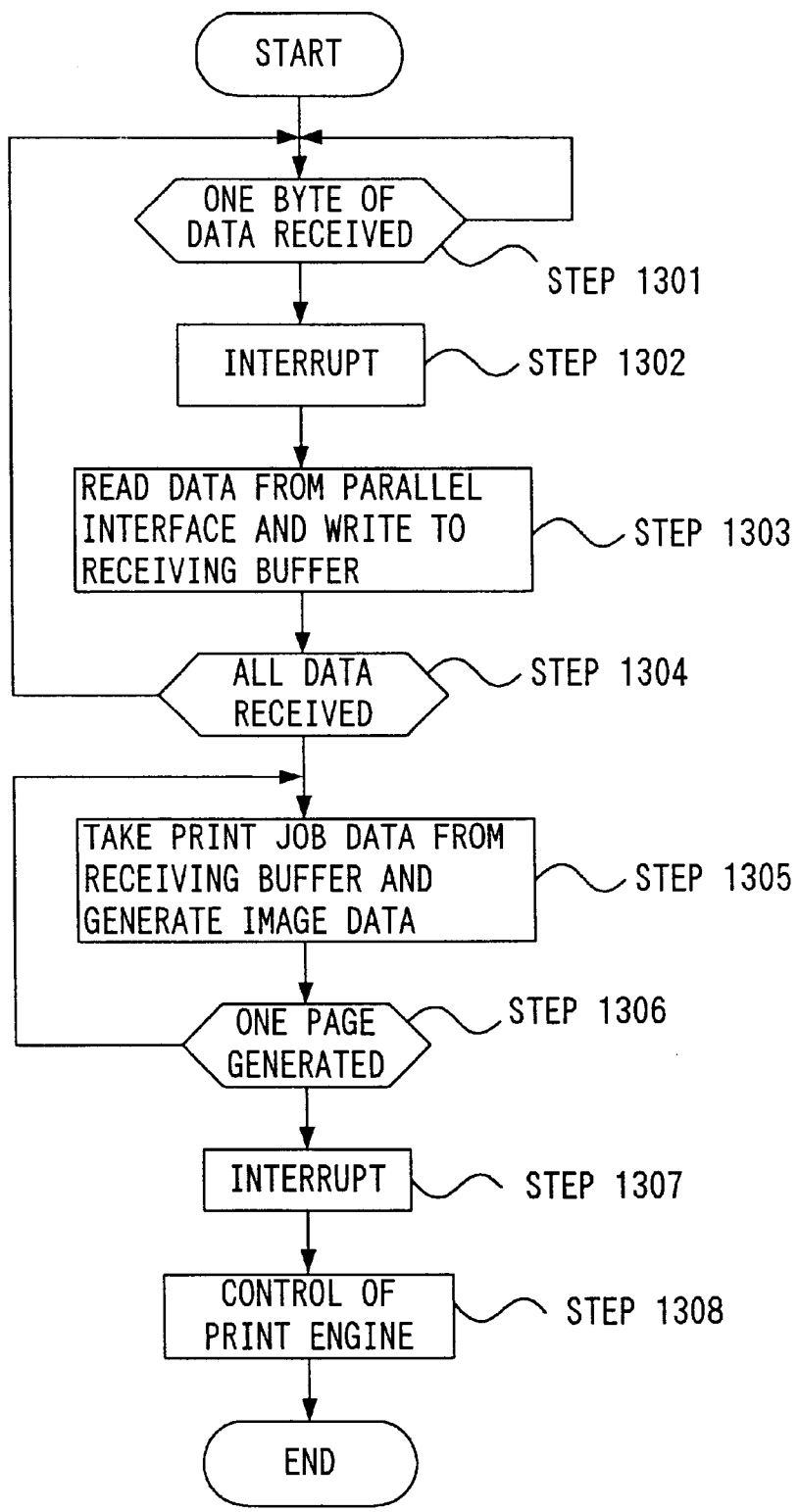
FIG. 13 is a flow chart illustrating the operation of the printer controller pertaining to the fourth embodiment.

FIG. 13 is a diagram illustrating the operation of the printer controller pertaining to this embodiment. In this figure, the parallel interface 1201 decides whether one byte of data out of the print job data has been received (step 1301). If one byte of data has been received, a communication interrupt is ordered (step 1302), and the data receiver 1202 takes print job data from the parallel interface 1201 and writes it to the receiving buffer 231' (step 1303). The data receiver 1202 decides whether all of the data has been received (step 1304). If it is decided that all of the data has been received, the image data generator 44 generates image data on the basis of the print job data held in the receiving buffer 231' (step 1305). The image data generator 44 decides whether the amount of image data required for printing has been generated, and if it is decided that enough image data for printing has been generated, the print engine controller 45 is notified to this effect (step 1306). The print engine controller 45 issues a paper feed command or the like to the print engine 5, and orders a data transfer request interrupt at the point when everything is ready for printing (step 1307). The print engine controller 45 controls the print engine 5 while monitoring the operating state of the print engine 5 (step 1308). As a result, printing is performed on the paper or other printer recording medium.

The above-mentioned operation is carried out according to the priorities of the various tasks. For example, in step 1305, the receipt of a print job data is performed (step 1303) when a communication interrupt occurs during the generation of image data (step 1302). Similarly, when a data transfer request interrupt occurs (step 1307), any processing up to that point is suspended and control of the print engine 5 is performed (step 1308). A task that has been interrupted and suspended in its execution is once again executed and processing performed when an execution right is granted.

Fifth Embodiment

Figure 14:
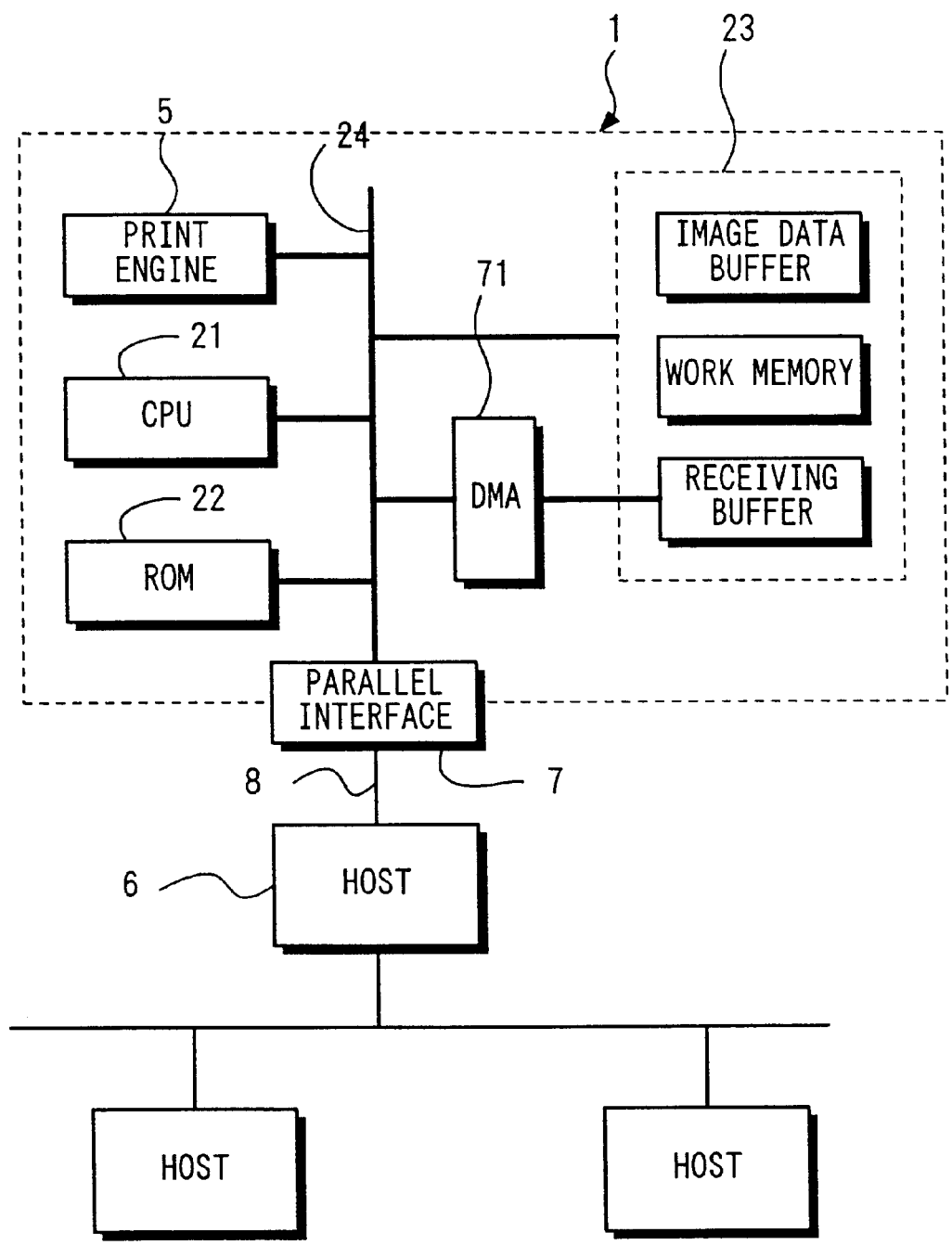
FIG. 14 is a block diagram illustrating the structure of the printer pertaining to the fifth embodiment.

This embodiment is characterized in that a DMA device is added to the structure of the printer in the fourth embodiment. FIG. 14 is a diagram illustrating the structure of the printer pertaining to this embodiment. In this figure, the parallel interface 7 is connected to the host 6 by a parallel dedicated bus 8. The DMA 71 performs data transfer instead of the CPU 21 between the parallel interface 7 and the memory 23.

Figure 15:
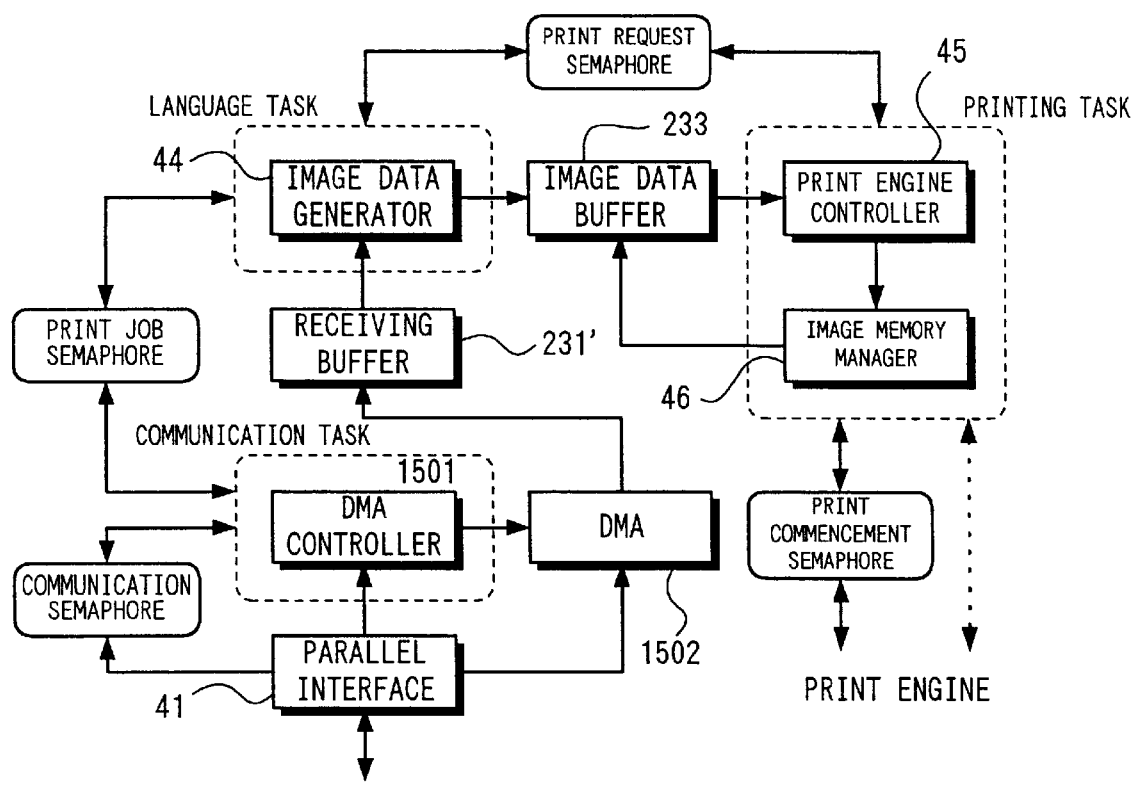
FIG. 15 is a block diagram of the printer controller pertaining to the fifth embodiment.

FIG. 15 is a function block diagram of the printer controller pertaining to this embodiment. In this figure, when the power is turned on, a DMA controller 1501 sets the size and address for the DMA 82 (corresponds to the DMA in FIG. 7). In other words, since the size of the data is unspecified with data transfer through a parallel dedicated bus, a suitable size is specified at the outset. The parallel interface 1201 sends a data transfer request to the DMA controller 1501 when one byte of data (print job data) arrives. A DMA 1502 writes the data arriving at the parallel interface 1201 to the receiving buffer 231' in the designated size. Once the writing of the designated size is complete, the DMA 82 orders an interrupt to the CPU 21. This interrupt results in the image data generator 44 generating image data on the basis of the print job data stored in the receiving buffer 231'. The other function implementation means are the same as in the first embodiment.

Figure 16:
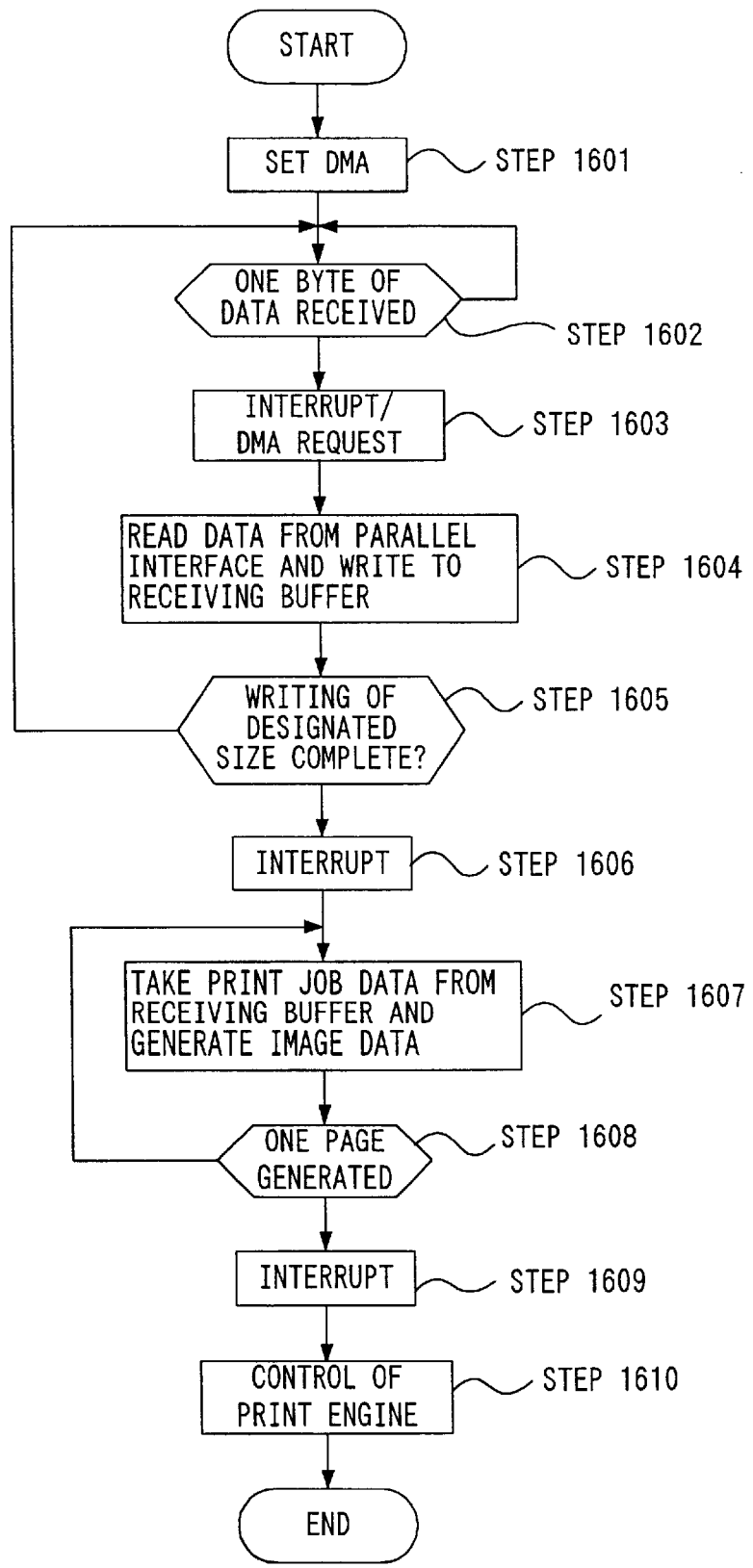
FIG. 16 is a flow chart illustrating the operation of the printer controller pertaining to the fifth embodiment.

FIG. 16 is a diagram illustrating the operation of the printer controller pertaining to this embodiment. As shown in this figure, first, the DMA controller 1501 sets the size and address for the DMA 1502 (step 1601). The parallel interface 1201 decides whether one byte of data out of the print job data has been received (step 1602). If one byte of data has been received, a communication interrupt is ordered, and a data transfer request is sent to the DMA 1502 (step 1603). The DMA 1502 takes the print job data from the parallel interface 1201 and writes it to the receiving buffer 231' (step 1604). The DMA 82 decides whether writing of the designated size has been completed (step 1605), and if it is decided that it has been completed, an interrupt to the effect that it has been completed is ordered to the CPU 21 (step 1606). As a result, the image data generator 44 generates image data on the basis of the print job data stored in the receiving buffer 231'. Subsequent processing is the same as in the embodiments given above.

The entire disclosure of Japanese Patent Application No. 10-292473 filed on Oct. 14, 1998, including specification, claims, drawings, and summary, is incorporated herein by reference in its entirety.

What is claimed is:

1. A printer controller comprising:

a first processor for exclusively controlling a print engine;

a second processor for exclusively controlling a communication control means, a language control means, and a print control means according to priorities assigned to these control means;

wherein said communication control means controls communication with host computers;

wherein said language control means generates image data;

wherein said print control means controls a said print engine;

wherein said print control means is assigned a higher priority than both said communication control means and said language control means;

wherein said communication control means is assigned a higher priority than said language control means; and wherein said second processor executes said communication control means instead of said language control means currently being executed if a communication interrupt occurs during the execution of said language control means, and executes said print control means instead of either one of said communication control means and said language control means currently being executed if an image data transfer request interrupt occurs during the execution of either one of said communication control means and said language control means.

2. The printer controller according to claim 1, wherein said communication control means includes extraction means for extracting print job data on the basis of packet data received from said host computers;

said language control means includes generation means for generating image data on the basis of print job data extracted by said extraction means; and said print control means includes supply means for supplying image data generated by said generation means to said print engine.

3. The printer controller according to claim 2, further comprising:

a first memory for storing said received packet data;

a second memory for storing print job data extracted by said extraction means; and a third memory for storing image data generated by said generation means.

4. The printer controller according to claim 1, wherein said execution means executes said various control means on the basis of a semaphore.

5. A printer controller comprising:

a first processor for exclusively controlling a print engine;

a second processor for exclusively controlling a communication task, a language control task, and a print control task according to priorities assigned to these tasks; and a memory for storing programs to be executed by said second processor;

said programs including:

a printing task for controlling said print engine;

a communication task for controlling communication with host computers, this task being assigned a lower priority than said printing task; and a language task for generating image data, this task being assigned a lower priority than said communication task, and wherein said second processor executes said communication task instead of said language task currently being executed according to said priority if a communication interrupt is received during the execution of said language task, and executes said printing task instead of either one of said communication task and said language task currently being executed according to said priority if a image data transfer request interrupt occurs during the execution of either one of said communication task and said language task.

6. A printer comprising:

a controller for exclusively controlling a communication control means, a language control means, and a print control means-according to priorities assigned to these control means;

a print engine for printing on a print recording medium; and a communication interface connected to a network such that communication with host computers is possible;

wherein said communication control means controls communication with said host computers via said communication interface;

wherein said language control means generates image data;

wherein said print control means controls the print engine;

wherein said print control means is assigned a higher priority than both said communication control means and said language control means;

said communication control means is assigned a higher priority than said language control means; and wherein said controller executes said communication control means instead of said language control means currently being executed if a communication interrupt occurs during the execution of said language control means, and executes said print control means instead of either one of said communication control means and said language control means currently being executed if a image data transfer request interrupt occurs during the execution of either one of said communication control means and said language control means.

7. The printer according to claim 6, wherein said communication control means includes extraction means for extracting print job data on the basis of packet data received from said host computers;

said language control means includes generation means for generating image data on the basis of print job data extracted by said extraction means; and said print control means includes supply means for supplying image data generated by said generation means to said print engine.

8. The printer according to claim 7, further comprising:

a first memory for storing said received packet data;

a second memory for storing print job data extracted by said extraction means; and a third memory for storing image data generated by said generation means.

9. The printer according to claim 6, wherein said controller executes said various control means on the basis of a semaphore.

10. The printer controller according to claim 5, wherein said communication task further includes the steps of:

storing said received packet data in a memory; and storing said extracted print job data in said memory; and said language task further includes the step of storing said generated image data in said memory.

* * * * *